United States Patent
Karlin et al.

(10) Patent No.: US 11,838,591 B2
(45) Date of Patent: Dec. 5, 2023

(54) METHODS AND SYSTEMS FOR RECOMMENDATIONS BASED ON USER-SUPPLIED CRITERIA

(71) Applicant: MarketX LLC, Bethesda, MD (US)

(72) Inventors: Michael Joseph Karlin, Bethesda, MD (US); Daniel Z. Zanger, San Francisco, CA (US); Ariel Mikhael Katz, Potomac, MD (US)

(73) Assignee: MARKETX LLC, Bethesda, MD (US)

( * ) Notice: Subject to any disclaimer, the term of this patent is extended or adjusted under 35 U.S.C. 154(b) by 0 days.

(21) Appl. No.: 17/759,029

(22) PCT Filed: Feb. 10, 2021

(86) PCT No.: PCT/US2021/017475
§ 371 (c)(1),
(2) Date: Jul. 18, 2022

(87) PCT Pub. No.: WO2021/163206
PCT Pub. Date: Aug. 19, 2021

(65) Prior Publication Data
US 2023/0040678 A1    Feb. 9, 2023

Related U.S. Application Data

(60) Provisional application No. 62/972,430, filed on Feb. 10, 2020.

(51) Int. Cl.
*H04N 21/466* (2011.01)
*H04N 21/25* (2011.01)
*H04N 21/258* (2011.01)
*H04N 21/475* (2011.01)

(52) U.S. Cl.
CPC ....... *H04N 21/4668* (2013.01); *H04N 21/251* (2013.01); *H04N 21/25891* (2013.01); *H04N 21/4666* (2013.01); *H04N 21/4755* (2013.01)

(58) Field of Classification Search
CPC ............. H04N 21/4668; H04N 21/251; H04N 21/25891; H04N 21/4666; H04N 21/4755
See application file for complete search history.

(56) References Cited

U.S. PATENT DOCUMENTS

| | | | | |
|---|---|---|---|---|
| 2010/0169910 | A1* | 7/2010 | Collins | H04H 60/65 725/14 |
| 2014/0282656 | A1* | 9/2014 | Belyaev | H04N 21/4751 725/59 |
| 2020/0167386 | A1* | 5/2020 | Venkataraman | H04N 21/4668 |

* cited by examiner

*Primary Examiner* — Nnenna N Ekpo
(74) *Attorney, Agent, or Firm* — Perkins Coie LLP

(57) ABSTRACT

Methods and systems are proposed herein to address the inefficiencies in the recommendation schemes available. More specifically, the embodiments disclosed herein provide a new recommendation scheme, whereby a user enters various criteria for what he/she would like to be recommended. For example, the system may receive a user preference for content recommendations from a user. The system may retrieve a user profile for the user. The system may compare the user preference to the user profile to determine a criterion for content recommendations for the user. The system may receive a content attribute for content provided by a content provider. The system may match the criterion to the content attribute. The system may, in response to matching the criterion to the content attribute, generate for display a recommendation to the user for the content.

18 Claims, 6 Drawing Sheets

What Kind of Recommendation Do You Need?

| Delivery Details | Price | Units | Item Description |
|---|---|---|---|

Where to: — 202

Delivery Date
02/05/2021 - 02/06/2021

Delivery Personnel
2 Adults — 206

Find — 204

FIG. 2

METHODS AND SYSTEMS FOR RECOMMENDATIONS BASED ON USER-SUPPLIED CRITERIA

CROSS-REFERENCE TO RELATED APPLICATIONS

This application is the U.S. national phase entry of PCT/US2021/017475, filed Feb. 10, 2021, which claims the benefit of priority of U.S. Provisional Patent Application No. 62/972,430, filed Feb. 10, 2020. The content of the forgoing applications is incorporated herein in its entirety by reference.

FIELD OF THE INVENTION

The invention relates to providing improved recommendations based on user-supplied criteria.

BACKGROUND

There is a movement in content creation to decentralize creation away from traditional large media providers (e.g., broadcasting studios, television networks, and other trusted parties) into something new whereby independent content creators and content consumers can interact with one another directly. Today, trusted parties control the experience, data (including, without limitation, viewer preferences, attributes, desires, pricing, and past actions), offerings, and potential recommendations. Any innovative system that can transfer control of some of these inputs from the trusted parties to the users would move content distribution and consumption in the direction of the decentralization wave and could improve overall viewer experience.

SUMMARY

Today, there is a plethora of content available for a user to view. Thus, the need arises for a way for users to navigate this content and find content that they desire. One source of content is trusted parties such as large corporations, streaming media providers, broadcasting studios, television networks, etc. (e.g., Amazon®, Netflix®, ABC®, Disney®). Another source is independent providers that publish user-generated content to an intermediary (e.g., YouTube®). Both systems provide recommendations for the user, but both systems are flawed. Trusted parties tag their own data and have control over determining what to recommend. Trusted parties may therefore push content to a user that is not necessarily what the user wants to watch most, but what the trusted party wants the user to watch and/or what content the user may access. For example, the trusted party may push a user towards original programming of that trusted party as opposed to programming of another entity.

Independent providers have another problem. Independent providers may fail to tag their content in a standardized way and/or may tag their content deceptively to garner more views and/or be recommended more often. Moreover, if independent providers do not tag their content in a manner to garner more views, they will lose out to independent providers that do deceptively tag their content or to trusted parties that prioritize their own content. Accordingly, independent providers lack both a technical means to avoid trusted parties from de-prioritizing their content as well as a mechanism for tagging their content in a standardized way that accurately represents the content. Similarly, users lack a mechanism for accessing content from independent providers and/or dictating what content should be recommended, what criteria upon which to recommend, and/or how that criteria is interpreted.

Methods and systems are proposed herein to address the inefficiencies in the recommendation schemes available. More specifically, the embodiments disclosed herein provide a new recommendation system, whereby a user enters various criteria for what he/she would like to be recommended (e.g., a reverse recommendation system). The system then interprets that criteria based on a profile of the user. That is, as opposed to conventional systems that may provide recommendations based on a proprietary recommendation algorithm that interprets user preferences and/or profile information, the reverse recommendation allows users to enter the criteria. Moreover, as opposed to conventional filtering mechanisms that allow users to filter data, the reverse recommendation system interprets the user-entered criteria based on user preferences and/or profile information. This reverse recommendation system utilizes content-based, collaborative, and/or hybrid filtering, as described below, and may in some embodiments utilize specific artificial intelligence and machine learning (collectively referred to as machine learning) models, architectures, and data preparation steps to power the reverse recommendation system. Finally, the system allows for the recommendations to be provided in a decentralized manner as both providers and users may enter criteria (and have their criteria independently interpreted) for both available content and recommendations for that content.

For example, if the user requests something that is "funny" and "not too long," the system first determines content that the user found funny. This may include, for example, programs with a comedy tag that were watched in their entirety by the user. The system may then find comedies of a similar type. The system may then determine content that is shorter than the user's normal viewing period (i.e., "not too long"). First, the system retrieves a time length of the user's typical viewing session, and then the system filters the comedies of the similar type for those that are shorter than the retrieved time length. For example, the system employs a "content-based filtering" (e.g., using item features to recommend other items similar to what users like, based on their previous actions or explicit feedback) component. Additionally or alternatively, the system may use metadata embedded into video and/or other content as well as any other third-party generated comment (e.g., user comments, reviews, etc.) to identify characteristics of content.

Likewise, for an independent content provider, the system interprets the content of their programming and/or the criteria they use to describe their content and develops a profile for the programming and/or provider. For example, while the provider may tag their content as "very" funny, the profile of the content, which may be built on third party content (e.g., ratings, user comments, etc.), may indicate that the content is only "slightly" funny. The system can then match this profile to the profile of the user provided criteria in a "collaborative filtering" manner (e.g., making automatic predictions (filtering) about the interests of a user by collecting preferences or taste information from many users (collaborating)). Combined approaches incorporating both content-based and collaborative filtering are called "hybrid filtering". For example, these approaches improve over conventional recommendation systems because conventional recommendation systems aim to recommend content that is already popular, viewed, and/or shared. This is particularly true for trusted parties' content, which may already be popular. In contrast, the system promotes diversity through the use of content-based, collaborative, and/or hybrid approaches that are keyed to the various criteria that the user enters for what he/she would like to be recommended. This diversity in recommendations increases the ability for recommendations to return content generated by independent providers as it lessens the inherent bias towards content generated by trusted parties.

In some embodiments, the reverse recommendation system includes machine learning models, architectures, and data preparation steps to power the reverse recommendation system and include technical features to alleviate the technical problems inherent in conventional systems. For example, an initial technical problem that the reverse recommendation system faces is data sparsity. Conventional recommendation systems that leverage machine learning may draw upon large data sets that are tailored to users and/or include enough data that preferences of users and connections between items may be determined. As such datasets may not be available (at least initially) for the reverse recommendation system, the system may leverage existing data for different components and/or stages of the system. The system may organize and train these different components using the novel architecture described herein.

For example, if information about content, information about a user, information used to interpret user-selected criteria, information about a provider, and/or information used to interpret provider-selected criteria about content is sparse, the system may select to use a machine learning model that provides more accuracy in data-sparse environments. In contrast, if data is not sparse, the system may select to use a machine learning model that provides the most accurate results irrespective of data sparsity. For example, content-based filtering algorithms (or models heavily influenced by content-based filtering algorithms) provide more accurate recommendations in environments with data sparsity (or for which no training information is available), but content-based filtering algorithms are not as accurate as collaborative filtering algorithms (or models heavily influenced by collaborative filtering algorithms) in environments without data sparsity (or for which training information is available). Accordingly, for each determination (e.g., how to tag content, how to tag a user, how to interpret user-selected criteria, how to tag a provider, and/or how to interpret provider-selected criteria, the reverse recommendation system may select the machine learning model (e.g., from the plurality of machine learning models) that is best suited for providing the most accurate result. Notably, the system may also select hybrid schemes (e.g., filtering algorithms based on content-based and/or collaborative filtering algorithms (or models heavily influenced by content-based and/or collaborative filtering algorithms). The system may also select the various ensemble architecture that is best suited for providing the most accurate result.

Another technical problem that the system faces is the ability to scale to a size necessary to accommodate the number of users and/or requests for recommendations, numbers of items upon which recommendations may be based, diversity of interests, and compensate for the dynamic changes in requests, items, etc. during use. Conventional systems, even those dedicated to single domains, suffer such problems. The system may overcome this problem through the clustering of networks and domains based on specific characteristics of users, items, and processing limitations. Additionally and/or alternatively, the system may generate latent representations of training data for one or more determinations. These latent representations may be used to decrease processing loads and increase the scalability.

In some aspects, methods and systems for providing recommendations based on user-supplied criteria using machine learning models are described. For example, the system may receive a user preference for content recommendations from a user. The system may retrieve a user profile for the user. The system may compare the user preference to the user profile to determine a criterion for content recommendations for the user. The system may receive a content attribute for content provided by a content provider. The system may match the criterion to the content attribute. The system may, in response to matching the criterion to the content attribute, generate for display a recommendation to the user for the content.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

FIG. 2 shows another illustrative example of user interface for generating a plurality of recommendations, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

As referred to herein, a "user interface" may comprise a human-computer interaction and communication in a device, and may include display screens, keyboards, a mouse, and the appearance of a desktop. For example, a user interface may comprise a way a user interacts with an application or a website. As referred to herein, "content" should be understood to mean an electronically consumable user asset, such as television programming, as well as pay-per-view programs, on-demand programs (as in video-on-demand (VOD) systems), Internet content (e.g., streaming content, downloadable content, webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, displayed, or accessed by user equipment devices, but can also be part of a live performance. Content may also include products, services, values, and/or other information. For example, content may refer to an item that is available from a content provider whether or not that item is a product, service, and/or combination.

Figure 1:
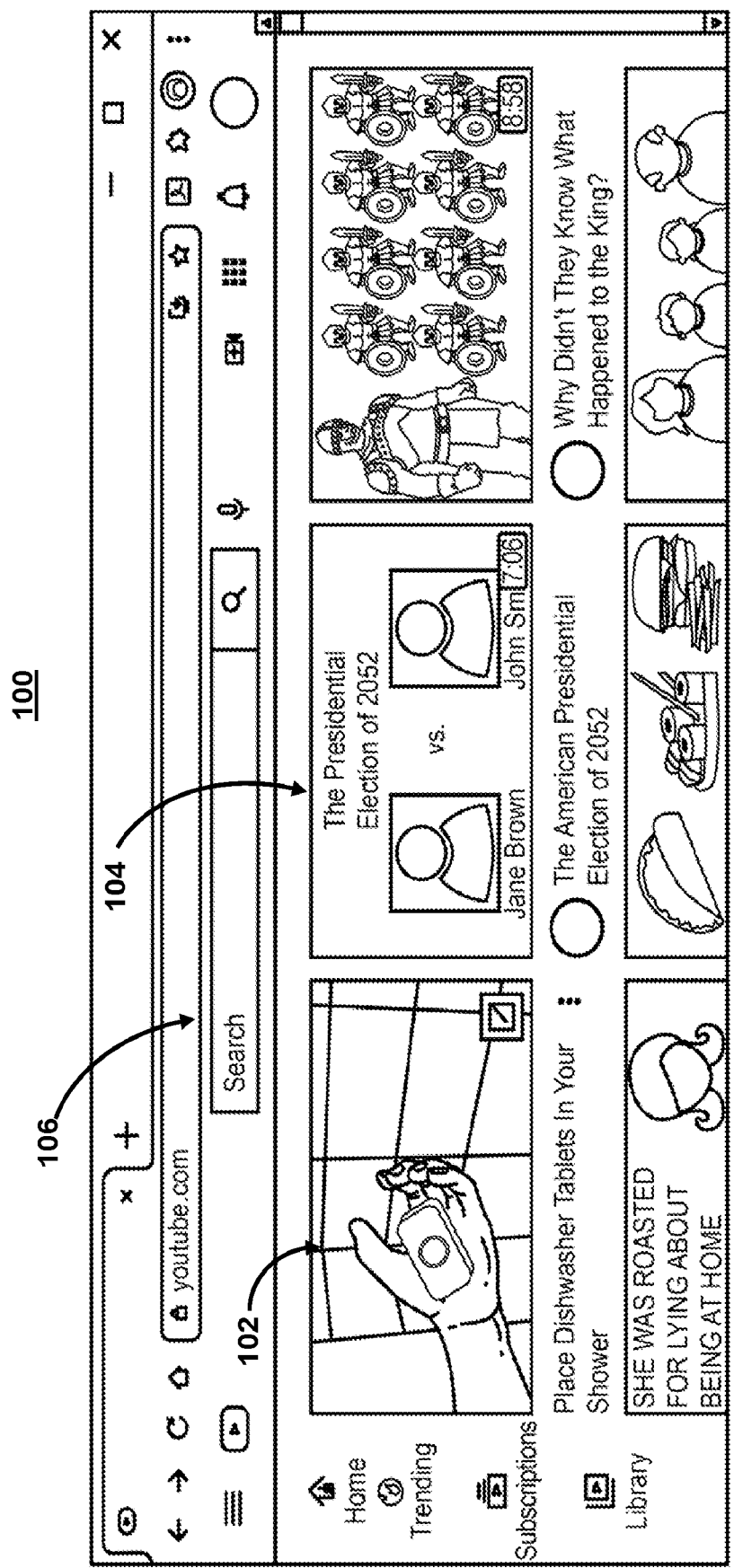
FIG. 1 shows an illustrative example of user interface for generating a plurality of recommendations, in accordance with one or more embodiments.

FIG. 1 shows an illustrative example of an application (e.g., a web browser) generating a plurality of recommendations, in accordance with one or more embodiments. For example, user interface 100 includes recommendation 102 and recommendation 104 as well as field 106, which may be used by a user to input criteria for content for recommendation 102 and recommendation 104. In some embodiments, the application may be provided as part of another application and/or may be provided as a plug-in, applet, browser extension, and/or other software component. In some embodiments, user interface (and/or components thereof) may be implemented through an API layer (e.g., API layer 450 (FIG. 4)). For example, the application may be part of an application (e.g., a web browser) and/or other program that may be toggled on or off. In another example, the application may be a software component that may be added and/or removed from another application.

In some embodiments, the application may comprise a conceptual data model of the application and/or one or more fields of the application (e.g., the fields currently displayed by the application). For example, the conceptual data model may be a representation of data objects, the associations between different data objects, and/or the rules of the application. In some embodiments, the system may determine a visual representation of the data and apply consistent naming conventions, default values, and semantics to one or more fields in the model. These naming conventions, default values, and semantics of the one or more fields in the model may then be used by the system to generate recommendations for the application. For example, each field may correspond to a category of criteria, characteristics, and/or options. The system may use a field identifier to identify the type of criteria being entered. For example, the system may compare the field identifier to a field database (e.g., a look up table database listing content and/or characteristics of content that correspond to the field) to identify content for a recommendation.

Each field may correspond to criteria for particular information and/or information of a particular characteristic of content. Alternatively or additionally, each field may provide a given function. This function may be a locally performed function (e.g., a function performed on a local device) or this function may be a remotely-executed function. In some embodiments, the function may include a link to additional information and/or other applications, which may be accessed and/or available locally or remotely. In some embodiments, the field may be represented by textual and/or graphical information. For example, a field may comprise a purchasing function through which a user may enter information (e.g., user credential and/or payment account information) that when transmitted may cause a purchase to occur. The system may identify these characteristics and application features for use in generating the conceptual data model.

In some embodiments, the system may detect information about a field of an application (e.g., metadata or other information that describes the field). For example, the information may describe a purpose, functions, origin, creator, developer, a system requirement (including required formats and/or capabilities), author, recommended use, and/or approved user. The information may be expressed in a human-readable and/or computer-readable language or may not be perceivable to a user viewing user interface 100. These fields may be used by the system to match criteria and/or other information submitted by a user and/or by a content provider. For example, in some embodiments, the system may receive content and/or criteria from a plurality of users and/or providers. In some embodiments, this criteria may describe content and/or may describe products or services related to given content. For example, a first provider may enter criteria about a price of content. A second provider may enter criteria about a first set of delivery terms for the content. A second provider may enter criteria about a second set of delivery terms for the content. A user may then enter criteria about acceptable delivery terms for the content. The system may match each of the received criteria by a field identifier for the content (e.g., a value that uniquely identifies the content and/or characteristics about the content). The system may then make a recommendation related to the content. For example, the system may recommend to the user the content with the first set of delivery terms (as these are better than the second set of delivery terms).

For example, the system may include multi-party transactions, whereby for whatever reason it takes many non-related parties to fulfill the transaction. An example, without limitation, would be a user, multiple providers, one or more lenders, one or more shippers, suppliers higher up the chain, etc. Fields to the bidding would include all these requirements as appropriate, allowing the system to extend to fulfill more realistic scenarios whereby such transactions can, and often do, require multiple parties to consummate and production can be planned on the fly for certain amenable items (like custom or handcrafted), reducing risk and overhead. Alternatively or additionally, the system may require certain terms, characteristics, and/or values for characteristics. For example, the scope of specified providers, terms, and/or specified users may be under the control of the system. Therefore, control may range from very controlled to practically decentralized in terms of who is allowed to participate under what terms and conditions.

A field may include a field identifier and/or a field characteristic associated with a particular type of data. For example, a field characteristic may be information (e.g., ordering, heading information, titles, descriptions, ratings information (e.g., parental control ratings, critic's ratings, etc.), source code data (e.g., HTML, source code headers, etc.), genre or category information, subject matter information, author/actor information, logo data, or other identifiers for the content provider), media format, file type, object type, objects appearing in the content (e.g., product placements, advertisements, keywords, context), or any other suitable information used to distinguish one section from another. In some embodiments, the field characteristic may also be human-readable text. The field characteristic may be determined to be indicative of the field (or content related to the value entered in the field) being of interest to the user based on a comparison of the field characteristic and user profile data for the user.

The information may also include a reference or pointer to user profile information that may be relevant to the selection and/or use of the field. The system may retrieve this information and/or compare it to another field (e.g., a description of acceptable field values) in order to verify, select, and/or use the information. For example, the description may indicate that the field value uses a particular format, falls within a particular range, relates to a particular user, content, user device, and/or user account.

The system may access a user profile. The user profile may be stored locally on a user device (e.g., a component of system 400 (FIG. 4)). The user profile may include information about a user and/or device of a user. The information may be generated by actively and/or passively monitoring actions of the user. The user profile may also include information aggregated from one or more sources (including third-party sources). The information in the user profile may include personally identifiable information about a user and may be stored in a secure and/or encrypted manner. The information in the user profile may include information about user settings and/or preferences of the user, activity of the user, demographics of the user, and/or any other information used to target a feature towards a user and/or customize features for a user.

Additionally, the user profile may include information about how the user describe his/her preferences, determinations (e.g., via a machine learning model) of how the user describes his/her preferences, how the user's descriptions of preferences match the descriptions of criteria provided by one or more content providers, and/or other information use to interpret criteria and match the criteria to criteria about content available for a recommendation.

In some embodiments, the system may pre-fetch content (or recommendations) as a user navigates and/or user one or more applications. The system may pre-fetched this information based on information in the user profile (e.g., a user preference or setting), a predetermined or standard recommendation selection (e.g., by the application), previously selected content when the application was last used, and/or other criteria. For example, the system may continuously, and in real-time, pre-fetch (or request) content for automatically populating the application and/or user interface 100. The system may continuously pre-fetch this information and/or may push this information to a local user device and/or edge server for immediate use if an application is activated. Accordingly, the system may minimize delays attributed to populating recommendations and attributed to processing time needed by a remote source.

Recommendation 102 may include a first link. For example, the link may include a hyperlink. For example, the link may include a link from a hypertext file or document to another location or file, typically activated by clicking on a highlighted word or image on the screen. The link may be an inline link that displays remote content without the need for embedding the content. For example, the inline link may display a modified version of accessible content (e.g., an image, a thumbnail, low resolution preview, cropped section, or magnified section of the accessible content). Alternatively, the link may be an anchor link and/or fat link. In some embodiments, the first link may comprise a push notification. For example, the push notification may have been generated in real-time based on a determination by the system (e.g., system 300 (FIG. 3)) that recommendations may be needed. In response to a user input of criteria in field 106 in user interface 100, the system may transmit a request to a remote source (e.g., cloud component 410 (FIG. 4)).

FIG. 2 shows another illustrative example of user interface for generating a plurality of recommendations, in accordance with one or more embodiments. For example, user interface 200 may include field 202. Field 202 may include user prompts for populating a field (e.g., describing the values and/or type of values that should be entered into field 202).

In response to a selection of user prompt 204, the system may generate a request for recommendation (e.g., based on values populated in fields 202 and 206). Alternatively or additionally, in response to a user selection of prompt 204, the system may identify an application shown in user interface 200 and determining whether a field (e.g., field 202 and 206) currently displayed in the user interface corresponds to a predetermined field that is automatically populated by the application. For example, the system may retrieve metadata used to determine a type of field and compare the type to a predetermined type of field that is automatically populated by an overlay application. In response to determining that the field corresponds to a predetermined field, the system may transmit to a remote source (e.g., cloud component 410 (FIG. 4)), a request for supplemental content for populating the field.

The request may comprise an API request (or call) from one application (e.g., an overlay application implemented on a local device) to an application on a server (e.g., a server implementing system 300 (FIG. 3)). The request may include one or more types of information that may be used by the web server to respond to the request. For example, the request may include information used to select application-specific data, identify an application, and/or determine a field for populating.

For example, in some embodiments, the application may create a library to simplify communicating using API requests and managing user, application, and session data. The system may therefore support multiple data providers and federated routing development, including better management of application/sub-application routing, consistent capture of data, and/or identification of fields. For example, a third-party application may have a field called "payment-type", the system may have data for populating payment type information in a record labeled "payTP". Using the library, the API request may normalize the format in the request.

Figure 3:
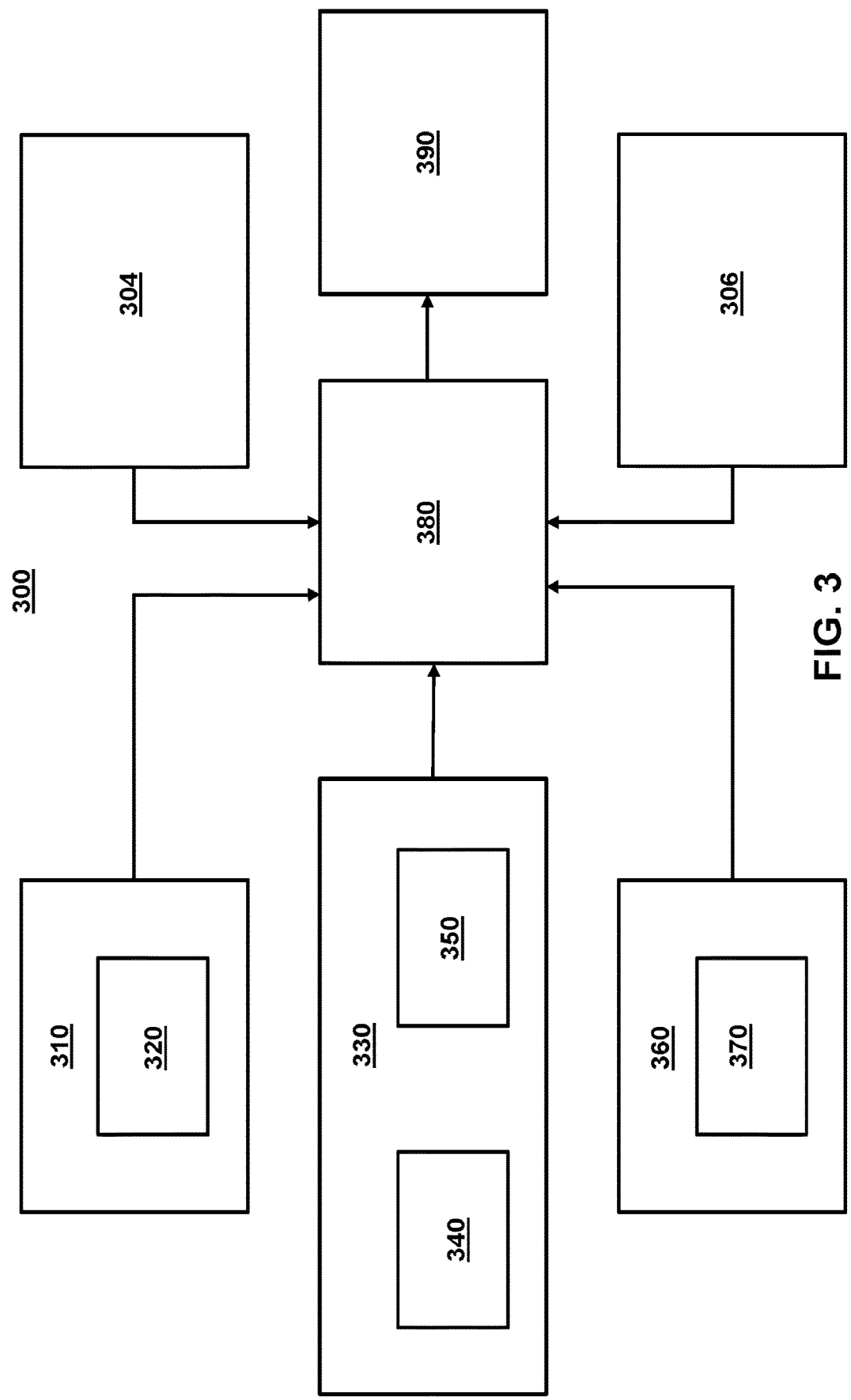
FIG. 3 shows a machine learning model architecture for matching user-supplied criteria to content, in accordance with one or more embodiments.

FIG. 3 shows a machine learning model architecture for matching user-supplied criteria to content, in accordance with one or more embodiments. For example, the system may include one or more machine learning models, architectures, and data preparation steps. The system may determine which machine learning model to use for one or more determinations (e.g., how to tag content, how to tag a user, how to interpret user-selected criteria, how to tag a provider, and/or how to interpret provider-selected criteria) used to generate a recommendation. The system may select the machine learning model (e.g., from the plurality of machine learning models) that is best suited for providing the most accurate result. For example, the system may select from various ensemble architectures featuring one or more models that are trained (e.g., in parallel) to provide the most accurate result.

System 300 may include model 304. Model 304 may comprise a machine learning model using content-based filtering (e.g., using item features to recommend other items similar to what users like, based on their previous actions or explicit feedback). System 300 may include model 306. Model 306 may comprise a machine learning model using collaborative filtering (e.g., making automatic predictions (filtering) about the interests of a user by collecting preferences or taste information from many users (collaborating)).

System 300 may include model 310. Model 310 may comprise a machine learning model that uses both content-based and collaborative filtering. For example, in model 310 outputs from model 320 (e.g., a content-based component (e.g., a model using content-based filtering)) may be input into a model using collaborative filtering (e.g., a model using collaborative filtering). System 300 may include model 360. Model 360 may comprise a machine learning model that also uses both content-based and collaborative filtering. For example, in model 360 outputs from model 370 (e.g., a collaborative component (e.g., a model using collaborative filtering)) may be input into a model using content-based filtering (e.g., a model using content-based filtering).

System 300 may include model 330. Model 330 may comprise a machine learning model that uses both content-based and collaborative filtering. For example, in model 330 outputs from both model 340 (e.g., a content-based component (e.g., a model using content-based filtering)) and model 350 (e.g., a collaborative component (e.g., a model using collaborative filtering)) may be input into model 330. For example, model 330 may comprise model 340 and model 350, which are trained in parallel.

Model 330 may use one or more techniques for a hybrid approach. For example, model 330 may weigh outputs from model 340 and model 350 (e.g., a linear combination of recommendation scores). Alternatively or additionally, the system may use a switching hybrid that uses some criterion to switch between recommendation techniques. Switching hybrids may introduce additional complexity into the recommendation process since the switching criteria must be determined, and this introduces another level of parameterization. Alternatively or additionally, the system may use recommendations from model 340 and model 350 presented at the same time. This may be possible where it is practical to make a large number of recommendations simultaneously. Alternatively or additionally, the system may use feature combinations from model 340 and model 350 in which outputs are thrown together into a single model (e.g., model 330). For example, model 340 and model 350 techniques might be merged, treating collaborative information as simply additional feature data associated with each example and using content-based techniques over this augmented data set.

Alternatively or additionally, the system may use a cascade hybrid that involves a staged process because one model refines the recommendations given by another model. The system may also use feature augmentation where an output from one technique is used as an input feature to another. For example, one technique is employed to produce a rating or classification of an item and that information is then incorporated into the processing of the next recommendation technique. Alternatively or additionally, the system may use a model learned by one recommender is used as input to another (e.g., model 340 becomes an input for model 350).

At model 380, system 300 may receive outputs from one or more of models 304, 306, 310, 330, and 360. Model 380 may determine which of the outputs to use for a determination used to generate a recommendation. For example, if information about content, information about a user, information used to interpret user-selected criteria, information about a provider, and/or information used to interpret provider-selected criteria about content is sparse, the system may select to use a machine learning model that provides more accuracy in data-sparse environments. In contrast, if data is not sparse, the system may select to use a machine learning model that provides the most accurate results irrespective of data sparsity. For example, content-based filtering algorithms (or models heavily influenced by content-based filtering algorithms) provide more accurate recommendations in environments with data sparsity (or for which no training information is available), but content-based filtering algorithms are not as accurate as collaborative filtering algorithms (or models heavily influenced by collaborative filtering algorithms) in environments without data sparsity (or for which training information is available).

In some embodiments, in order to reduce data processing, system 300 may further comprise a cluster layer at model 380 that identifies clusters. For example, the system may group a set of items in such a way that items in the same group (e.g., a cluster) are more similar (in some sense) to each other than to those in other groups (e.g., in other clusters). For example, the system may cluster recommendations (and/or determinations used to generate a recommendation). The system may compare data from multiple clusters in a variety of ways in order to determine a recommendation. In some embodiments, model 380 may also include a latent representation of outputs from models 304, 306, 310, 330, and 360. The system may input a first feature input into an encoder portion of a machine learning model (e.g., model 380) to generate a first latent representation, wherein the encoder portion of the machine learning model is trained to generate latent representations of inputted feature inputs. The system may input the first latent representation into a decoder portion of the machine learning model to generate a first reconstruction of data used to generate recommendations, wherein the decoder portion of the machine learning model is trained to generate reconstructions of inputted feature inputs. The system may then use the latent representation to generate a recommendation. As the latent representation is a dimensionally reduced output, the system reduces the amount of data processed.

Model 380 may be trained to determine which of models 304, 306, 310, 330, and 360 is the most accurate based on the amount of data used for a given determination. Model 380 may then generate output 390. System 300 may then generate a recommendation based on output 390.

Figure 4:
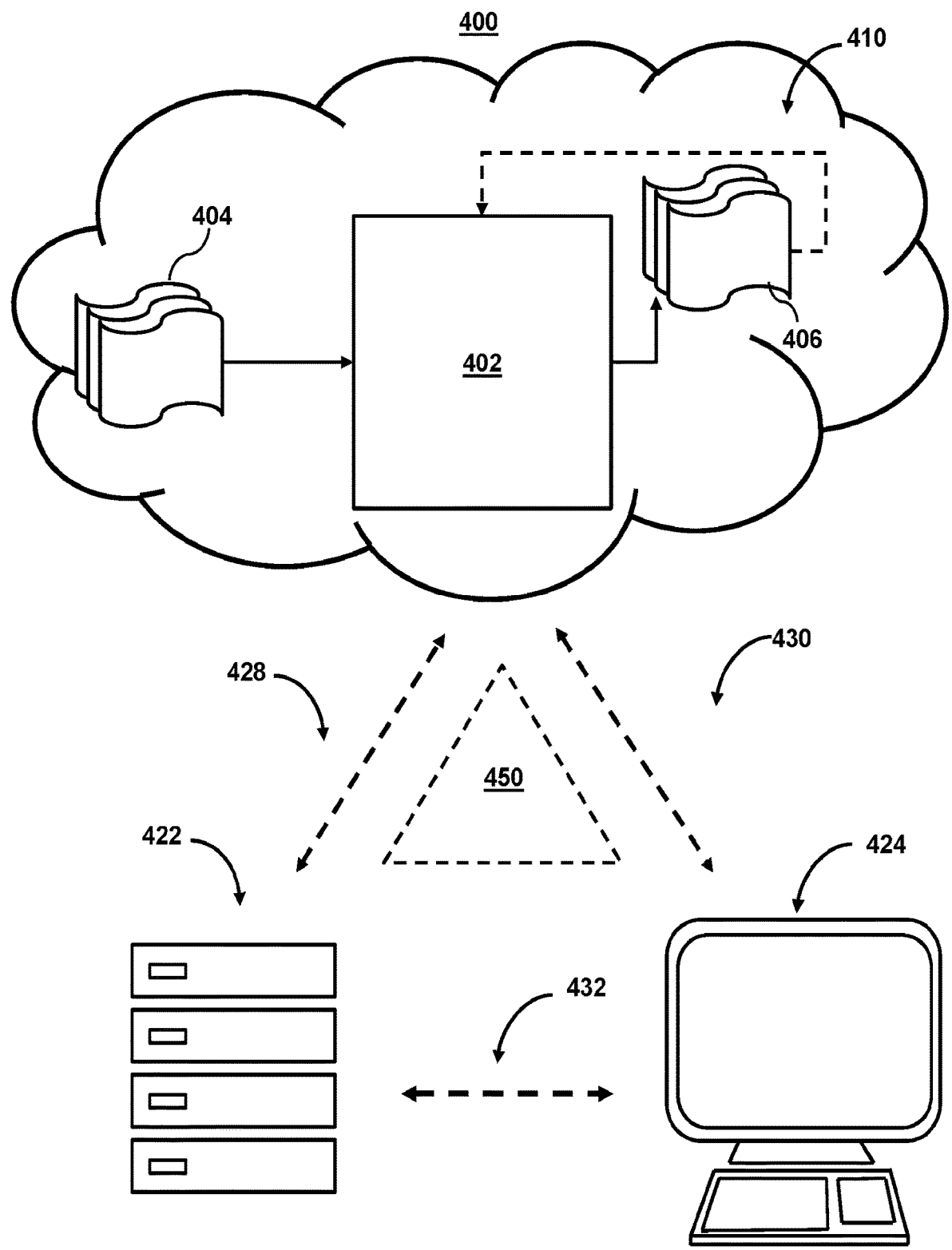
FIG. 4 shows a system for matching user-supplied criteria to content, in accordance with one or more embodiments.

FIG. 4 is an exemplary system diagram for content delivery based on user-supplied criteria. It should be noted that the methods and systems described herein may be applied to any goods and/or services. While the embodiments are described herein with respect to media content, it should be noted that the embodiments herein may be applied to any good and/or service. Furthermore, the term recommendations should be broadly construed. For example, a recommendation may include any human or electronically consumable portion of data. For example, the recommendations may be displayed (e.g., on a screen of a display device) as media that is consumed by a user and/or a computer system.

FIG. 4 is an exemplary system diagram for content delivery based on user-supplied criteria. As shown in FIG. 4, system 400 may include server 422 and user terminal 424 (which in some embodiments may correspond to a personal computer). While shown as a server and personal computer, respectively, in FIG. 4, it should be noted that server 422 and user terminal 424 may be any computing device, including, but not limited to, a laptop computer, a tablet computer, a hand-held computer, other computer equipment (e.g., a server), including "smart," wireless, wearable, and/or mobile devices. FIG. 4 also includes cloud components 410. Cloud components 410 may alternatively be any computing device as described above and may include any type of mobile terminal, fixed terminal, or other device. For example, cloud components 410 may be implemented as a cloud computing system and may feature one or more component devices. It should also be noted that system 400 is not limited to three devices. Users may, for instance, utilize one or more devices to interact with one another, one or more servers, or other components of system 400. It should be noted that, while one or more operations are described herein as being performed by particular components of system 400, those operations may, in some embodiments, be performed by other components of system 400. As an example, while one or more operations are described herein as being performed by components of server 422, those operations may, in some embodiments, be performed by components of cloud components 410. In some embodiments, the various computers and systems described herein may include one or more computing devices that are programmed to perform the described functions. Additionally, or alternatively, multiple users may interact with system 400 and/or one or more components of system 400. For example, in one embodiment, a first user and a second user may interact with system 400 using two different components.

With respect to the components of server 422, user terminal 424, and cloud components 410, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 4, both server 422 and user terminal 424 include a display upon which to display data (e.g., as shown in FIG. 1).

Additionally, as server 422 and user terminal 424 are shown as touchscreen smartphones, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 400 may run an application (or another suitable program). The application may cause the processors and/or control circuitry to perform operations related to recommending content. It should be noted that, although some embodiments are described herein specifically with respect to machine learning models, other predictive, statistically-based analytical models may be used in lieu of or in addition to machine learning models in other embodiments.

Each of these devices may also include memory in the form of electronic storage. The electronic storage may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 4 also includes communication paths 428, 430, and 432. Communication paths 428, 430, and 432 may include the Internet, a mobile phone network, a mobile voice or data network (e.g., a 5G or LTE network), a cable network, a public switched telephone network, or other types of communications networks or combinations of communications networks. Communication paths 428, 430, and 432 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 410 may be a database (tabular or graph) configured to store user data for a user. For example, the database may include user data that the system has collected about the user through prior interactions, both actively and passively. Alternatively, or additionally, the system may act as a clearing house for multiple sources of information about the user, provider, and/or content. This information may be compiled into a cross-platform profile. For example, one or more of cloud components 410 may include a microservice and/or components thereof. In some embodiments, the microservice may be a collection of applications that each collect one or more of the plurality of variables.

Cloud components 410 may include model 402, which may be a machine learning model. Model 402 may take inputs 404 and provide outputs 406. The inputs may include multiple datasets such as a training dataset and a test dataset. Each of the plurality of datasets (e.g., inputs 404) may include data subsets related to user data, original content, and/or alternative content. In some embodiments, outputs 406 may be fed back to model 402 as inputs to train model 402. For example, the system may receive a first labeled feature input, wherein the first labeled feature input is labeled with a known description (e.g., used by the system to interpret criteria) for the first labeled feature input (e.g., a feature input based on how a user natively describes criteria). The system may then train the first machine learning model to classify the first labeled feature input with the known description).

In another embodiment, model 402 may update its configurations (e.g., weights, biases, or other parameters) based on the assessment of its prediction (e.g., outputs 406) and reference feedback information (e.g., user indication of accuracy, reference labels, or other information). In another embodiment, where model 402 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 402 may be trained to generate better predictions.

In some embodiments, model 402 may include an artificial neural network. In such embodiments, model 402 may include an input layer and one or more hidden layers. Each neural unit of model 402 may be connected with many other neural units of model 402. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 402 may be self-learning and trained, rather than explicitly programmed, and can perform significantly better in certain areas of problem solving, as compared to traditional computer programs. During training, an output layer of model 402 may correspond to a classification of model 402, and an input known to correspond to that classification may be input into an input layer of model 402 during training. During testing, an input without a known classification may be input into the input layer, and a determined classification may be output.

In some embodiments, model 402 may include multiple layers (e.g., where a signal path traverses from front layers to back layers). In some embodiments, back propagation techniques may be utilized by model 402 where forward stimulation is used to reset weights on the "front" neural units. In some embodiments, stimulation and inhibition for model 402 may be more free-flowing, with connections interacting in a more chaotic and complex fashion. During testing, an output layer of model 402 may indicate whether or not a given input corresponds to a classification of model 402 (e.g., an incident).

For example, in some embodiments, the system may train a machine learning model (e.g., an artificial neural network) to detect known descriptions based on a feature input. For example, the system may receive user data (e.g., comprising the variables and categories of variables described in FIGS. 1-2). The system may then generate a series of features inputs based on the training data. For example, the system may generate a first feature input based on training data comprising user data corresponding to a first known error (or error likelihood). The system may label the first feature input with the first known description (e.g., labeling the data as corresponding to a classification of the description).

For example, in some embodiments, the system may train a machine learning model (e.g., an artificial neural network) to determine a recommendation (e.g., a given criterion). For example, the system may receive a criterion (e.g., comprising a user's description). The system may then generate a series of features inputs based on the criterion. For example, the system may generate a feature input based on training data comprising content corresponding to the model's interpretation of the user's description, and the system may determine a response (e.g., a recommendation of content).

The system may then train a machine learning model to detect the first known content based on the labeled first feature input. The system may also train a machine learning model (e.g., the same or different machine learning model) to detect a second known content based on a labeled second feature input. For example, the training process may involve initializing some random values for each of the training matrices (e.g., of a machine learning model) and attempting to predict the output of the input feature using the initial random values. Initially, the error of the model will be large, but comparing the model's prediction with the correct output (e.g., the known classification), the model is able to adjust the weights and biases values until having the model provides the required predictions.

The system may receive user data via a microservice and/or other means. For example, the microservice may comprise a collection of applications that each collect one or more of a plurality of variables. For example, the system may extract user data from an API layer operating on a user device or at a service provider (e.g., via a cloud service accessed by a user). Additionally or alternatively, the system may receive user data files (e.g., as a download and/or streaming in real-time or near real-time).

System 400 also includes API layer 450. For example, in some embodiments, the system may be implemented as one or more APIs and/or an API layer. In some embodiments, API layer 450 may be implemented on server 422 or user terminal 424. Alternatively or additionally, API layer 450 may reside on one or more of cloud components 410. API layer 450 (which may be A REST or Web services API layer) may provide a decoupled interface to data and/or functionality of one or more applications. API layer 450 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages including Ruby, Java, PHP, and JavaScript. SOAP Web services have traditionally been adopted in the enterprise for publishing internal services as well as for exchanging information with partners in B2B transactions.

API layer 450 may use various architectural arrangements. For example, system 400 may be partially based on API layer 450, such that there is strong adoption of SOAP and RESTful Web-services, using resources like Service Repository and Developer Portal but with low governance, standardization, and separation of concerns. Alternatively, system 400 may be fully based on API layer 450, such that separation of concerns between layers like API layer 450, services, and applications are in place.

In some embodiments, the system architecture may use a microservice approach. Such systems may use two types of layers: Front-End Layer and Back-End Layer where microservices reside, in this kind of architecture, the role of the API layer 450 may provide integration between Front-End and Back-End. In such cases, API layer 450 may use RESTful APIs (exposition to front-end or even communication between microservices). API layer 450 may use AMQP (e.g., Kafka, RabbitMQ, etc.). API layer 450 may use incipient usage of new communications protocols such as gRPC, Thrift, etc.

In some embodiments, the system architecture may use an open API approach. In such cases, API layer 450 may use commercial or open source API Platforms and their modules. API layer 450 may use a developer portal. API layer 450 may use strong security constraints applying WAF and DDoS protection, and API layer 450 may use RESTful APIs as standard for external integration.

Figure 5:
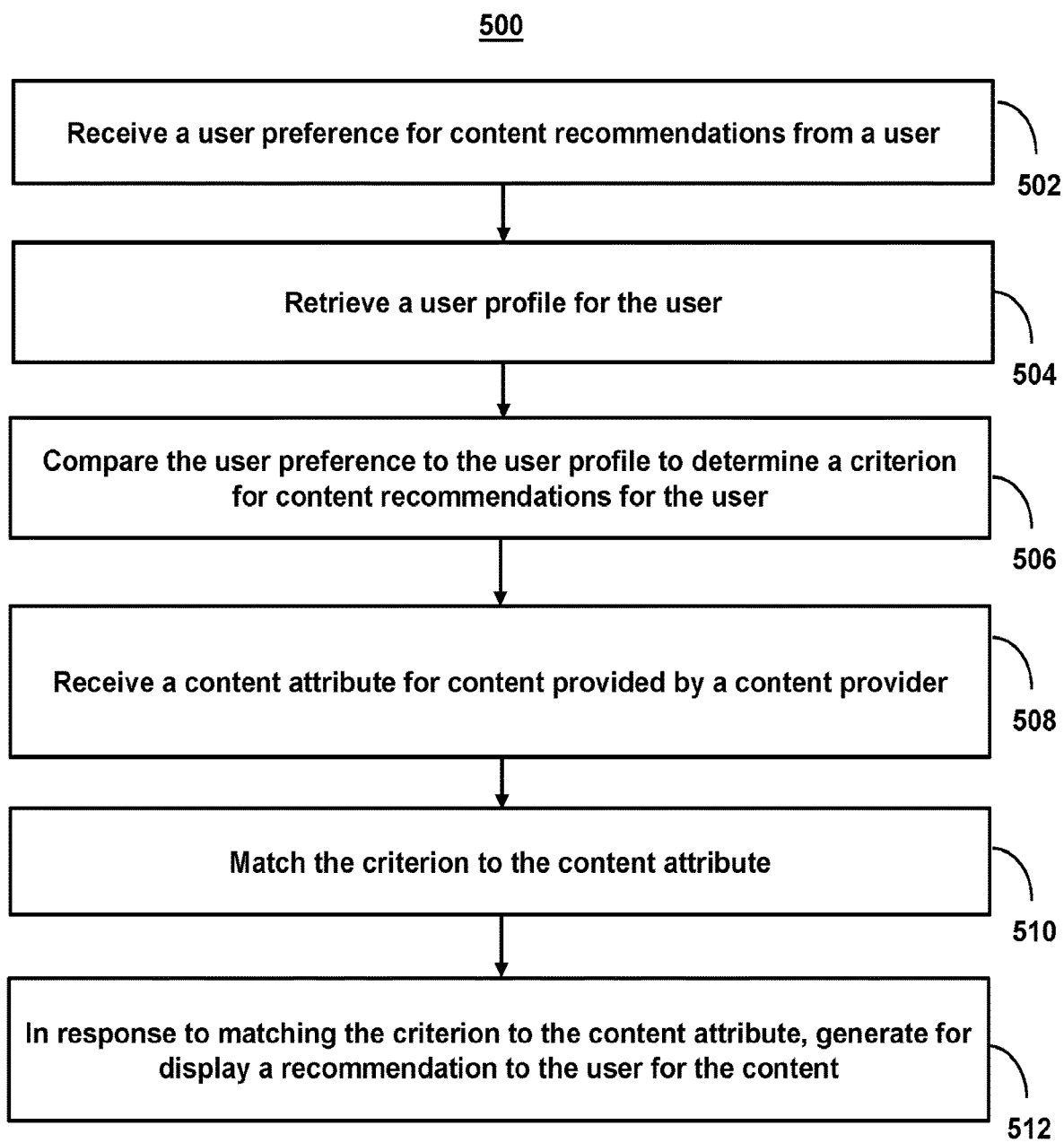
FIG. 5 shows a flowchart for matching user-supplied criteria, in accordance with one or more embodiments.

FIG. 5 shows a flowchart for matching user-supplied criteria, in accordance with one or more embodiments. It should be noted that the methods and systems disclosed herein may be applied in any medium (in a store, website, database, data and/or Blockchain, and/or other similar structure organized in the decentralized function of a Blockchain, and/or through any decentralized data structure management technology and/or through any distributed ledger technology) (collectively and/or separately, "Medium"). For example, while the embodiments described herein relate to an over-the-top ("OTT") content and streaming media, the embodiments disclosed herein could be applied to numerous technical areas.

In some embodiments, the subject matter of the recommendations discussed herein may refer to any potential goods and/or services and may be identified by a serial number or product SKU. For example, the system may generate a media asset recommendation featuring the serial number or product SKU. Each good and/or service may have one or more associated user-supplied criteria. These criteria may include user preferences of a user such as a preferred genre, length, type, feature character, featured actor, etc. Additionally or alternatively, a potential user criteria may indicate: (a) maximum amount willing to pay; (b) condition of good and/or service required; (c) what type of Provider ("Specified Provider") he/she is willing to receive content from (which may be further based on a category, reputation, location, e-Retailer, brick & mortar retailer, specific retailers, size of retailers, distance, etc.); (d) number of units of the good and/or service; (e) duration or lapsing conditions of the offer (i.e., lapses in five minutes, after a purchase is made, etc.); (f) whether he is willing to take in odd lots from multiple providers; (g) if the user or provider want their name to be public or anonymous; (h) whether a user and provider can agree whether their identities are public or private; (i) the return conditions that the user wants; (j) how the user is willing to pay for the goods or services; (k) whether wants to group multiple items in shipping or pickup, etc. ("Terms"); (l) how long the user is willing to wait for prices or other selling attributes to improve for the system to then automatically make a sale based on current data and projections; and/or (m) how much risk versus net utility the user is willing to take by waiting.

At step 502, process 500 (e.g., using one or more components described in FIG. 4) may receive a user preference for content recommendations from a user. For example, the system may receive user inputs via user interface 100 (FIG. 1) or user interface 200 (FIG. 2). The system may then use these criteria, either entered manually or determined automatically (e.g., based on a user profile), to find content for the user. Accordingly, the user may define the criteria that he or she would like to use for any content recommendations.

At step 504, process 500 (e.g., using one or more components described in FIG. 4) may retrieve a user profile for the user. For example, in some embodiments, the system may further compare the criteria to the user's profile to clarify, quantify, and/or qualify a criterion. For example, if a user enters that he or she prefers "scary movies", the system may review the user's viewing history to determine what movies the user has viewed. For example, the user profile may be based on previous actions of the user. As described above the system may compare various fields of data to determine what data and/or what values to compare.

At step 506, process 500 (e.g., using one or more components described in FIG. 4) may compare the user preference to the user profile to determine a criterion for content recommendations for the user. For example, the system may compare metadata or other information about these movies to determine if the movies correspond to a particular genre (e.g., horror). If the system determines that these movies do correspond to the genre, the system may set a recommendation criterion corresponding to that genre. In another example, the system may use information from the user profile to interpret the received user preference (e.g., input) and/or normalize the input based on industry and/or popular standards.

In some embodiments, comparing the user preference to the user profile to determine the criterion for content recommendations for the user, further comprises generating a first feature input (e.g., as described in FIG. 6) for a first machine learning model (e.g., as described in FIGS. 3-4) based on the user preference and the user profile and inputting the first feature input into the first machine learning model to receive the criterion, wherein the first machine learning model comprises a first content-based filtering component and a first collaborative filtering component (e.g., as described in FIGS. 3-4).

For example, the user may specify and rank all the conditions that it/he/she is willing to make regarding a potential selection. Such rankings may be viewed as applications of the subfield of machine learning known as preference learning, which has particular relevance for recommender systems. For example, as described in FIG. 3 above, the system may perform one or more steps (e.g., clustering and/or generating a latent representation) to reduce data processing. Additionally or alternatively, in some embodiments, the system may perform a progressive removal of non-relevant content according to the information stored in a user profile. The system may use a model that processes information about user interests acquired in an explicit/active (e.g., letting users express their opinion about items) or implicit/passive (e.g., studying some behavioral features) way and exploit these data to generate a list of recommended items.

Moreover, in some embodiments, the system may normalize the selections and/or rankings based on information about the user (e.g., retrieved from a user profile), industry information, or information from providers. For example, the system may use one or more artificial intelligence algorithms to match user criteria to a user's true behavior and/or sentiment. Additionally or alternatively, various types of optimization artificial intelligence algorithms may be used to find user/provider matches (as discussed above).

At step 508, process 500 (e.g., using one or more components described in FIG. 4) may receive a content attribute for content provided by a content provider. For example, similar to the user supplied criteria, the system may provide providers with an opportunity to describe their content and outline terms, tags, and metadata (collectively "content attributes") that are compared to the criteria supplied by the users. For example, providers may limit whom they are willing to recommend to ("Specified User") by providing fields for user attributes to be reviewed. Furthermore, the scope of the Specified User may revolve around payment terms, creditworthiness, reviews, shipping terms, location, and/or any other user attributes selected by the provider. This information may be included in a "provider profile." Furthermore, the system may populate the provider profile based on reviews from third parties. The weighting and source of the data along with various higher level composite attributes of customers could be created, modified or improved based on interactions between customers and providers, along with stated preferences, utilizing machine learning.

At step 510, process 500 (e.g., using one or more components described in FIG. 4) matches the criterion to the content attribute. For example, the system may match the user-supplied criteria to the provider-supplied content attributes. Upon determining a match, the system may issue a recommendation. It should be noted that a "recommendation" may include an offer to view content and/or an offer to buy content. In some embodiments, the "recommendation" may include the acceptance of the provider to the terms of the user. For example, the user may issue an offer in the form of criteria (including cost) that may be accepted by the provider providing a recommendation. In another example, the criterion may include a list of approved providers, and the content attribute may identify a provider. The system may then match the criterion to the content attribute by determining that the provider is on the list of approved providers.

In some embodiments, users with the same criteria may queue in line based on a differing criterion (e.g., financial terms only) or may join a buy offer on exactly the same terms as a previous user. Regardless, all such specifications would have to comply with Public Policy (non-racist, non-sexist, etc.).

Under the system, the scope of Specified Providers, Terms, and/or Specified Users are under the control of the system. Therefore, control can range from very controlled to practically decentralized in terms of who is allowed to participate under what terms and conditions. Transactions may occur on any medium. Privacy can be set by the parties as well. It should be recognized that under the system, users may compete with one another on one or more criteria (e.g., price or flexibility on terms of purchase).

At step 512, process 500 (e.g., using one or more components described in FIG. 4) generates for display a recommendation to the user for the content in response to matching the criterion to the content attribute. After a recommendation has been issued, the system may finalize a selection. To finalize a selection, a Specified Provider chooses a user offer (or the system automatically makes a match based on the confluence of user criteria and provider requirements), accepts the Terms set by the user, and provides the content. The registration of the provided content may occur between the user and provider directly. The selection, once finalized, can be recorded in the accounting system of any Medium or in private. The recording would include the Terms that went into the transaction, and any specified providers/users that were part of the conditions of sale. In addition, upon agreement the recording can be posted on the system's proprietary database or proprietary decentralized data structure, in a confidential manner.

If the parties permit publicizing execution of the transaction, then the system's proprietary data structure or time indexed graph database can also record the finalized transaction as an off-chain transaction and can be an Oracle to confirm such transaction occurred, as reported elsewhere, to add to the overall data available on the system. For example, the system may operate a clearinghouse for multiple transactions, in which different parties may affect the amount and terms of transactions in a decentralized manner. The ability to record fake transactions is curtailed, because in such circumstances the "providers" involved may not have the proper credentials (i.e., positive reviews or third party determination that they meet specific standards, etc.), and thereby users who want a reputable provider would insist on more stringent Specified Provider Inputs and attributes of the User. Additionally or alternatively, the system may ban disreputable parties.

It is important to note for this description and the claims, the definition of "user" and "provider" is expanded, and not limited to just recommendations for the providing, or sale of, goods or services. This can include leasing transactions, shared transactions, fractional ownership transactions, temporary beyond merely "buying" and "selling," etc. For example, the system allows for a recommendation to be made for any of these things. For transactions related to leasing or fractional ownership, additional fields can include costs/willingness to purchase insurance for the items, for example.

As a further embodiment, the system can be deployed on an Internet of Things (IoT) whereby there would be automatic or integrated communication with the System across a network of devices. For example, a person looking for lunch could utilize the system by programming her smart phone to automatically send out a message at a given time or from a given situation offering to pay $10 for a type/category of lunch within a 300-yard radius that expires automatically in 5 minutes after being issued. Thus, the person may request "recommendations" fitting her specific criteria.

The offer could "hit" an IoT network of possible restaurants that fit her specifications on her offer, and within that network hit all connected devices. Technically, this may or may not be different from posting to a Medium as defined earlier as it may only be held on the IoT network versus a decentralized database. Those restaurants can automatically determine whether or not to accept, and the first one to do so wins the bid (e.g., is recommended). Alternatively, the user could specify that all restaurants which accept within a given time frame be presented to the user for manual selection. All of this can be automated in networks, whereby the offer is placed on an electronic Medium only accessible to those restaurants that would qualify, and those restaurants can have pre-programmed responses to such offers that traverse their internal IoT connected devices to accept the offer and process the transaction. As 5G networks and beyond come into existence and use, it would be anticipated that the system will be deployed on IoT networks to automate such transactions, to the extent technically possible. In some embodiments, the person may further have a chance to "confirm" the recommendation. Alternatively, the system may automatically confirm the recommendation in response to the restaurant accepting (and being the first to do so) the person's recommendation request.

Another embodiment to the system would be multi-party transactions, whereby it takes many non-related parties to fulfill the transaction. An example, without limitation, would be a user, multiple providers, one or more lenders, one or more shippers, suppliers higher up the chain, etc. Fields to the bidding would include all these requirements as appropriate, allowing the system to extend to fulfill more realistic scenarios whereby such transactions can and often do require multiple parties to consummate and production can be planned on the fly for certain amenable items (like custom or handcrafted), reducing risk and overhead.

The algorithmic details of the system (e.g., as described above in FIGS. 3-4 and below in FIG. 6) are designed to allow for automatic/systematic optimization of pricing, matchmaking, and desired features for participants in the system. Participants can manually input desired criteria (e.g., price, features of the products, specified providers, etc.) or can instead allow some or all fields to be filled in automatically using the operations research and artificial algorithms provided, with a goal ranging from filling in preferences to guiding the matching and assignment of prices and other attributes.

It should be noted that there are numerous technical improvements for this system over traditional recommendation systems. These technical benefits include a more precise recommendation system that includes additional potential recommendations, increased efficiency in recommendations activity, and flexibility for providing and receiving recommendations.

For example, in conventional OTT content delivery, the providers are placing their content on websites, databases, and stores, and users are reacting to those listings. If content is not listed or cannot be found, a user does not know if the content is available. In the system, because users are placing their specific criteria and providers' content description are being normalized, additional content may be found. Additionally, as users provide their criteria, providers may learn more about what potential users want.

For example, in the system, user X indicates a willingness to select Product A (e.g., a movie rental), the scope of Permitted Providers (e.g., streaming media providers) she is willing to select from, and the terms and conditions of such selection (e.g., rental periods, rental price, genre types, etc.). If a term is more advantageous to User X versus what is already offered publicly by the Permitted Providers, User X has introduced a new mechanism for introducing potential recommendations that would not be available without the system in place.

An additional technical benefit would be the ability to optimize recommendation criteria. For example, as the system normalizes both the user-supplied criteria and the tags, content descriptions, and/or recommendation requirements supplied by the provider, recommendations that would normally not be provided due to inconsistent data, terminology, etc. are issued.

Additionally, users may determine the specific criteria (e.g., terms and conditions) for receiving a recommendation. Currently, users are forced to find a provider and accept a recommendation at whatever terms and conditions are offered.

Additionally, by making aggregate user criteria (both explicit and inferred implicit) available to the providers, the system provides for more data that can be used by users and providers alike to tailor both the content that is provided as well as the content that is created.

The system will also provide other forms of automated business intelligence such as descriptive and predictive analytics for providers and users, data structure to store data as graph with metadata and attributes and time dimension, drawing on all the transaction data within the system, across time and accounting for the graph structure of users and transactions, with graph neural networks and other machine learning techniques, as applicable. These can include user segmentation, trends among types of products sold and created, correlations between these and leading indicators (NLP, economic, etc.), seasonality, future pricing, and availability of products and resources in the supply chain.

To produce recommendations, the system may use an optimization algorithm to match providers and uses. The optimization algorithms may be employed by one or more models (e.g., as described in FIG. 3). In some embodiments, this involves solving relevant optimization programs of the general form:

$$\text{Minimize } F(x) \quad (1)$$

$$\text{Subject to } G_i(x) \le b_i, i=1, \ldots, M \quad (2)$$

where F in (1) is the objective function to be optimized, the inequalities in (2) (along with suitable functions $G_i$, i=1, ..., M) are the constraints to be satisfied, M is a positive integer, and x a vector of 0-1 binary variables $x_{ijk}$, $1 \le i,j,k \le N$ (in any suitable order). A solution to the problem (1)-(2) with values $x_{ijk}$ will indicate which content and provider should be allocated to which user. In fact, assigning content j from provider k to user i will correspond to an optimal solution of (1)-(2) if and only if $x_{ijk}=1$ (where we assume here only for notational simplicity that the respective numbers of content, choices, content providers, and users are all the same and equal to N).

For example, the system may minimize the sum of values for a given criterion for all users (e.g., prices paid for all purchased content and/or products or services) once users have declared their criteria via the system. Moreover, the system may do this within the context of certain constraints such as those involving limited amounts of content that must be distributed among a given number of users. So, for an instantiation of the optimization program (1)-(2) which would solve this problem, the system could take the objective function (as in (1) above) to be:

$$F(x) = \Sigma_{i,j,k} p_{ijk} x_{ijk} \quad (3)$$

As an example set of possible constraints (as in (2)), we could consider the following:

$$\Sigma_{j,k} p_{ijk} x_{ijk} \le m_i, 1 \le i \le N, \quad (4)$$

$$\Sigma_i x_{ijk} \le n_{jk}, 1 \le i,k \le N, \quad (5)$$

$$\Sigma_i x_{ijk} = 1, 1 \le j,k \le N. \quad (6)$$

Here, the values $p_{ijk}$ denote the cost for user i of receiving content j from provider k. The value $m_i$ denotes the maximum user i can pay for all content purchased, and $n_{jk}$ gives the number of content items of type j that provider k has. The last of the three constraints ensures that content j sold by provider k must be sold to exactly one user.

A problem of the form (1)-(2) with objective function defined as in (3) and constraints as in (4)-(6) is an integer program. As an integer linear program, an efficient solution of the problem may not in some instances be necessarily routine. However, many exact or approximate algorithms do exist for its solution, including branch-and-bound techniques, metaheuristic algorithms such as simulated annealing, and simple rounding of the corresponding continuous linear program (the one obtained by ignoring the 0-1 constraint on the solution values). Note as well that, if desired, maximization of profits made by the sellers can also be incorporated into the objective in the optimization problem above. Of course, in addition to (4)-(6), further constraints can also be included, such as the types of seller ("specified seller") the buyer is willing to buy from or constraints on the latency response times (which could actually also be incorporated into the objective as a parameter to minimize).

The optimization problem (1)-(2) involves a single, real-valued objective function, but, for situations involving multiple, independent agent users, the effectiveness of the system could be enhanced through admitting multiple (scalar) objective functions. This extension corresponds to allowing vector-valued functions F in (1). In this case, a point $x_0$ is an optimal (or Pareto-optimal) point of $F=(F_1, \ldots, F_M)$ if and only if, for all x, $F_l(x_0) \leq F_l(x)$ for all $l=1, \ldots, M$ and $F_l(x_0) < F_l(x)$ for some $l \in \{1, \ldots, M\}$. So, for example, instead of minimizing a linear combination of user criteria terms $p_{ijk}$ as in (3), we could attempt to find a Pareto-optimal solution. Another method to optimize vector-valued objective functions F, which could be preferable for some applications, would be simply to transform the vector-valued objective into a scalar-valued one, replacing F itself with, for example, an objective like $F_1 + \ldots + F_M$ (i.e., the sum of the individual components of F) or another suitable choice.

Predictive modeling and machine learning methods may also be incorporated into the framework of the problem (3)-(6) (or, more generally, into that of (1)-(2)). For example, these types of techniques could be used to estimate the price values $p_{ijk}$ in advance. Such supervised machine learning approaches as linear or nonlinear regression, including neural networks and support vector machines, could be exploited to predict these prices should sufficient amounts of training data be available. In particular, pricing data can be sequential, time-dependent data, and this means that recurrent neural networks, CNN, and/or transformer specifically, may be highly applicable in this setting for accurate price forecasting. In fact, we can even view this problem, at least in some cases, as one involving time series prediction and approach it using Random Forest algorithms, Bayesian RNNs, LSTMs, transformer based models, CNNs or other methods, or combinations of two or more of these and the following: Neural Ordinary Differential Equations (NODEs), Stiff and non-stiff universal ordinary differential equations (universal ODEs), Universal stochastic differential equations (universal SDEs), Universal delay differential equations (universal DDEs) Universal partial differential equations (universal PDEs), Universal jump stochastic differential equations (universal jump diffusions), Hybrid universal differential equations (universal DEs with event handling). We can also use graph embedding layers such as gCNNs and message passing layers to learn directly from temporal graph data which can be especially suited for time series forecasting. Indeed, unlike some types of neural network models which require discretizing observation intervals, the continuously-defined dynamics of NODEs can naturally incorporate data that arrive at arbitrary times.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-4 could be used to perform one or more of the steps in FIG. 5.

Figure 6:
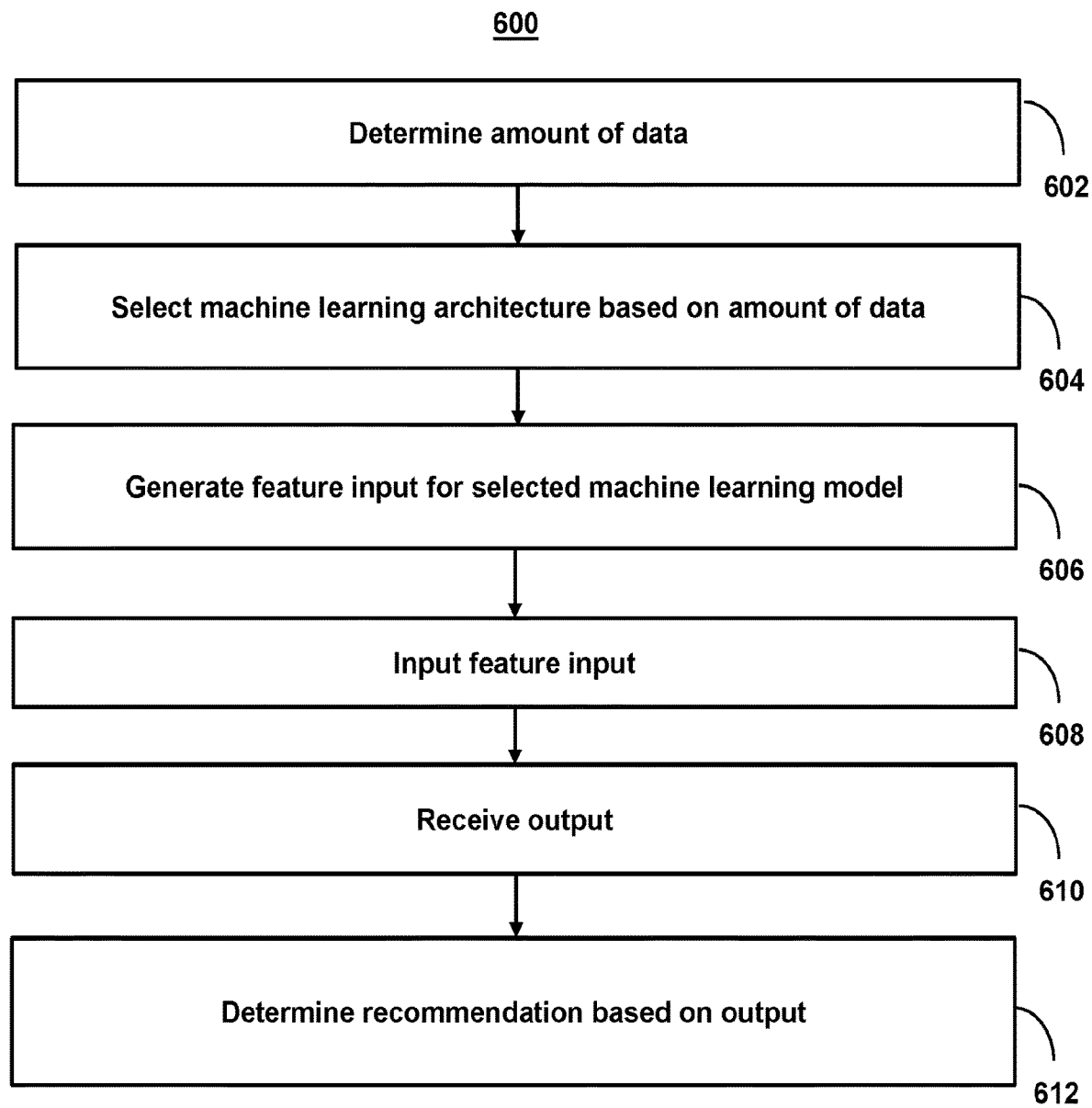
FIG. 6 shows a flowchart for selecting a machine learning model for matching user-supplied criteria, in accordance with one or more embodiments.

FIG. 6 shows a flowchart for selecting a machine learning model for matching user-supplied criteria, in accordance with one or more embodiments. For example, the system may use specific algorithms and machine learning models (e.g., as described above in FIGS. 3-4 and below in FIG. 6) that are designed to allow for automatic/systematic optimization of pricing, matchmaking, and desired features for participants in the system. Participants can manually input desired criteria (e.g., price, features of the products, specified providers, etc.) or can instead allow some or all fields to be filled in automatically using the operations research and artificial algorithms provided, with a goal ranging from filling in preferences to guiding the matching and assignment of prices and other attributes. For example, each determination (e.g., how to tag content, how to tag a user, how to interpret user-selected criteria, how to tag a provider, and/or how to interpret provider-selected criteria, the reverse recommendation system may select the machine learning model (e.g., from the plurality of machine learning models) that the system uses to generate a recommendation.

At step 602, process 600 (e.g., using one or more components described in FIG. 4) determines an amount of data. For example, the system may receive an initial status report of available data required for one or more determinations. The initial status report may indicate an amount of data (e.g., training data), an amount of training a given model has had, or a confidence level in the model (e.g., a confidence that the model accurately determines the determination). Additionally or alternatively, the system may use information filtering and information retrieval systems rely on relevant feedback to capture an appropriate snapshot of user preferences in order to allow the system to interpret the user's input.

At step 604, process 600 (e.g., using one or more components described in FIG. 4) selects a machine learning architecture based on the amount of data. For example, the system may select a machine learning model from a plurality of machine learning models (e.g., the plurality of machine learning models described in FIG. 3). The machine learning models may use Bayesian classifiers, decision tree learners, decision rule classifiers, neural networks, and/or nearest neighbor algorithms.

At step 606, process 600 (e.g., using one or more components described in FIG. 4) generates feature input for selected machine learning models. For example, the system may generate a feature input with a format and/or values that are normalized based on the model into which the feature input is to be input. For example, in some embodiments, the system may use a patent representation (e.g., as described in FIG. 3)), in which a lower dimensional representation of data may be used.

At step 608, process 600 (e.g., using one or more components described in FIG. 4) inputs feature input. For example, the system may input a feature input into a machine learning model. For example, the system may compare a user preference to a user profile to determine a criterion for content recommendations for the user by generating a first feature input for a first machine learning model based on the user preference and the user profile and inputting the first feature input into the first machine learning model to receive the criterion, wherein the first machine learning model comprises a first content-based filtering component and a first collaborative filtering component. In another example, the system may compare a content attribute to a content provider profile to determine a normalized content attribute for content recommendations for the content provider by generating a second feature input for a second machine learning model based on the content attribute and the content provider profile and inputting the second feature input into the second machine learning model to receive the normalized content attribute, wherein the second machine learning model comprises a second content-based filtering component and a second collaborative filtering component.

At step 610, process 600 (e.g., using one or more components described in FIG. 4) receives output. For example, the system may receive an output from a machine learning model. For example, the output may indicate a determination used to generate a recommendation. For example, each determination (e.g., how to tag content, how to tag a user, how to interpret user-selected criteria, how to tag a provider, and/or how to interpret provider-selected criteria, the reverse recommendation system may select the machine learning model (e.g., from the plurality of machine learning models) may be based on one or more outputs from one or more machine learning models.

At step 612, process 600 (e.g., using one or more components described in FIG. 4) determines a recommendation based on the output. For example, the system may determine a recommendation based on the output from the machine learning model. For example, in response to an output that indicates that a criterion matches a content attribute, the system may generate for display a recommendation to the user for the content. In another example, in response to an output that indicates that a user input (e.g., a user likes scary movies) matches a standardized user input (e.g., the user likes scary movies of a particular level of scariness), the system may generate for display a recommendation to the user based on the standardized user input.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-4 could be used to perform one or more of the steps in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method of providing recommendations based on user-supplied criteria, the method comprising: receiving a user preference for content recommendations from a user; retrieving a user profile for the user; comparing the user preference to the user profile to determine a criterion for content recommendations for the user; receiving a content attribute for content provided by a content provider; matching the criterion to the content attribute; and in response to matching the criterion to the content attribute, generate for display a recommendation to the user for the content.
2. The method of any one or the preceding embodiments, further comprising: receiving, using control circuitry, a content description of the content from the provider; retrieving, using the control circuitry, a provider profile for the provider; and comparing, using the control circuitry, the content description to the provider profile to determine the content attribute for the content.
3. The method of any one or the preceding embodiments, wherein the provider and customer profiles are based on reviews from third parties or data derived by analysis of third-party reviews in conjunction with other information.
4. The method of any one or the preceding embodiments, wherein the criterion includes a list of approved providers, and the content attribute identifies the provider, and wherein matching the criterion to the content attribute comprises determining that the provider is on the list of approved providers.
5. The method of any one or the preceding embodiments, wherein the criterion is included in a first category, and wherein criteria in the first category are determined for a plurality of users.
6. The method of any one or the preceding embodiments, wherein matching the criterion comprises minimizing a sum of a value of the criterion in the first category for the plurality of users.
7. The method of any one or the preceding embodiments, further comprising training a recurrent neural network, CNN, and/or transformer to minimize a sum of a value of the criterion in the first category for the plurality of users.
8. The method of any one or the preceding embodiments, further comprising training a machine learning model to determine the criterion based on the user preference and user profile.
9. The method of any one or the preceding embodiments, wherein the user profile is based on previous actions of the user.
10. A tangible, non-transitory, machine-readable medium storing instructions that, when executed by a data processing apparatus, cause the data processing apparatus to perform operations comprising those of any of embodiments 1-9.
11. A system comprising: one or more processors; and memory storing instructions that, when executed by the processors, cause the processors to effectuate operations comprising those of any of embodiments 1-9.
12. A system comprising means for performing the steps of embodiments 1-9.

What is claimed is:

1. A system of providing recommendations based on user-supplied criteria using machine learning models, the system comprising:
   memory; and
   non-transitory computer-readable memory comprising instructions that cause a processor to perform operations comprising:
   receiving a user preference for content recommendations from a user;
   retrieving a user profile for the user;
   comparing the user preference to the user profile to determine a criterion for content recommendations for the user by generating a first feature input for a first machine learning model based on the user preference and the user profile and inputting the first feature input into the first machine learning model to receive the criterion, wherein the first machine learning model comprises a first content-based filtering component and a first collaborative filtering component;

receiving a content attribute for content provided by a content provider;
retrieving a content provider profile for the content provider;
comparing the content attribute to the content provider profile to determine a normalized content attribute for content recommendations for the content provider by generating a second feature input for a second machine learning model based on the content attribute and the content provider profile and inputting the second feature input into the second machine learning model to receive the normalized content attribute, wherein the second machine learning model comprises a second content-based filtering component and a second collaborative filtering component;
matching the criterion to the normalized content attribute; and
in response to matching the criterion to the normalized content attribute, generating for display a recommendation to the user for the content.

2. A method of providing recommendations based on user-supplied criteria, the method comprising:
receiving, using control circuitry, a user preference for content recommendations from a user;
retrieving, using the control circuitry, a user profile for the user;
comparing, using the control circuitry, the user preference to the user profile to determine a criterion for content recommendations for the user, wherein comparing the user preference to the user profile to determine the criterion for content recommendations for the user, further comprises:
generating a first feature input for a first model based on the user preference and the user profile; and
inputting the first feature input into the first model to receive the criterion, wherein the first model comprises a first content-based filtering component and a first collaborative filtering component;
receiving, using the control circuitry, a content attribute for content provided by a content provider;
retrieving a content provider profile for the content provider;
comparing the content attribute to the content provider profile to determine a normalized content attribute for content recommendations for the content provider by:
generating a second feature input for a second model based on the content attribute and the content provider profile; and
inputting the second feature input into the second model to receive the normalized content attribute, wherein the second model comprises a second content-based filtering component and a second collaborative filtering component;
matching the criterion to the normalized content attribute; and
in response to matching the criterion to the normalized content attribute, generating for display a recommendation to the user for the content.

3. The method of claim 2, further comprising:
receiving, using the control circuitry, a content description of the content from the content provider;
retrieving, using the control circuitry, a provider profile for the content provider; and
comparing, using the control circuitry, the content description to the provider profile to determine the content attribute for the content.

4. The method of claim 3, wherein the provider profile is based on reviews from third parties or data derived by analysis of third-party reviews in conjunction with other information.

5. The method of claim 2, wherein the criterion includes a list of approved providers, and the content attribute identifies the content provider, and wherein matching the criterion to the content attribute comprises determining that the content provider is on the list of approved providers.

6. The method of claim 2, wherein the criterion is included in a first category, and wherein criteria in the first category are determined for a plurality of users.

7. The method of claim 6, wherein matching the criterion comprises minimizing a sum of a value of the criterion in the first category for the plurality of users.

8. The method of claim 6, further comprising training a recurrent neural network, CNN, and/or transformer, or other suitable learning and/or optimization algorithm to minimize a sum of a value of the criterion in the first category for the plurality of users.

9. The method of claim 2, further comprising training a machine learning model to determine the criterion based on the user preference and user profile.

10. The method of claim 2, wherein the user profile is based on previous actions of the user.

11. A non-transitory, computer-readable medium for providing recommendations based on user-supplied criteria comprising instructions embedded thereon that when executed by one or more processors causes operations comprising:
receiving a user preference for content recommendations from a user;
retrieving a user profile for the user;
comparing the user preference to the user profile to determine a criterion for content recommendations for the user, wherein comparing the user preference to the user profile to determine the criterion for content recommendations for the user, further comprises:
generating a first feature input for a first model based on the user preference and the user profile; and
inputting the first feature input into the first model to receive the criterion, wherein the first model comprises a first content-based filtering component and a first collaborative filtering component;
receiving a content attribute for content provided by a content provider;
retrieving a content provider profile for the content provider;
comparing the content attribute to the content provider profile to determine a normalized content attribute for content recommendations for the content provider by generating a second feature input for a second model based on the content attribute and the content provider profile and inputting the second feature input into the second model to receive the normalized content attribute, wherein the second model comprises a second content-based filtering component and a second collaborative filtering component;
matching the criterion to the normalized content attribute; and
in response to matching the criterion to the normalized content attribute, generating for display a recommendation to the user for the content.

12. The non-transitory, computer-readable medium of claim 11, wherein the operations further comprise:
receiving a content description of the content from the content provider;

retrieving a provider profile for the content provider; and
comparing the content description to the provider profile to determine the content attribute for the content.

13. The non-transitory, computer-readable medium of claim 12, wherein the provider profile is based on reviews from third parties or data derived by analysis of third-party reviews in conjunction with other information.

14. The non-transitory, computer-readable medium of claim 11, wherein the criterion includes a list of approved providers, and the content attribute identifies the content provider, and wherein matching the criterion to the content attribute comprises determining that the content provider is on the list of approved providers.

15. The non-transitory, computer-readable medium of claim 11, wherein the criterion is included in a first category, and wherein criteria in the first category are determined for a plurality of users.

16. The non-transitory, computer-readable medium of claim 15, wherein matching the criterion comprises minimizing a sum of a value of the criterion in the first category for the plurality of users.

17. The non-transitory, computer-readable medium of claim 15, wherein the operations further comprise: training a recurrent neural network or other suitable learning and/or optimization algorithm to minimize a sum of a value of the criterion in the first category for the plurality of users.

18. The non-transitory, computer-readable medium of claim 11, wherein the operations further comprise: training a machine learning model to determine the criterion based on the user preference and user profile.

* * * * *